(12) United States Patent
Jutzi et al.

(10) Patent No.: US 8,079,056 B2
(45) Date of Patent: Dec. 13, 2011

(54) SYNCHRONIZING A MEDIA CENTER ON A CORRECT CHANNEL

(75) Inventors: Curtis Jutzi, Lake Oswego, OR (US); David W. Shinsel, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1088 days.

(21) Appl. No.: 10/928,318

(22) Filed: Aug. 30, 2004

(65) Prior Publication Data

US 2006/0048195 A1   Mar. 2, 2006

(51) Int. Cl.
*H04N 7/173* (2011.01)
(52) U.S. Cl. ........................................... 725/119
(58) Field of Classification Search .................. 725/119
See application file for complete search history.

(56) References Cited

U.S. PATENT DOCUMENTS

| 5,715,020 | A  | * | 2/1998  | Kuroiwa et al. ............... 348/734 |
| 2003/0103088 | A1 | * | 6/2003  | Dresti et al. .................. 345/835 |
| 2005/0035846 | A1 | * | 2/2005  | Zigmond et al. ............. 340/5.22 |
| 2005/0081245 | A1 | * | 4/2005  | Arad et al. ..................... 725/100 |
| 2005/0229203 | A1 | * | 10/2005 | Jutzi ............................... 725/14 |
| 2005/0246746 | A1 | * | 11/2005 | Yui et al. ........................ 725/80 |

* cited by examiner

*Primary Examiner* — Scott Beliveau
*Assistant Examiner* — Mark Stanley
(74) *Attorney, Agent, or Firm* — Trop, Pruner & Hu, P.C.

(57) ABSTRACT

A media center and an audio visual (AV) unit may be remotely synchronized on the same remodulation channel. A system may include a media center connected to an audio visual (AV) unit; and a remote control unit to activate the media center. The remote control unit may receive signals from the media center to indicate a transmission channel for the AV unit, and the remote control unit may send the received signals to the AV unit to independently cause the AV unit to switch to the indicated transmission channel.

7 Claims, 2 Drawing Sheets

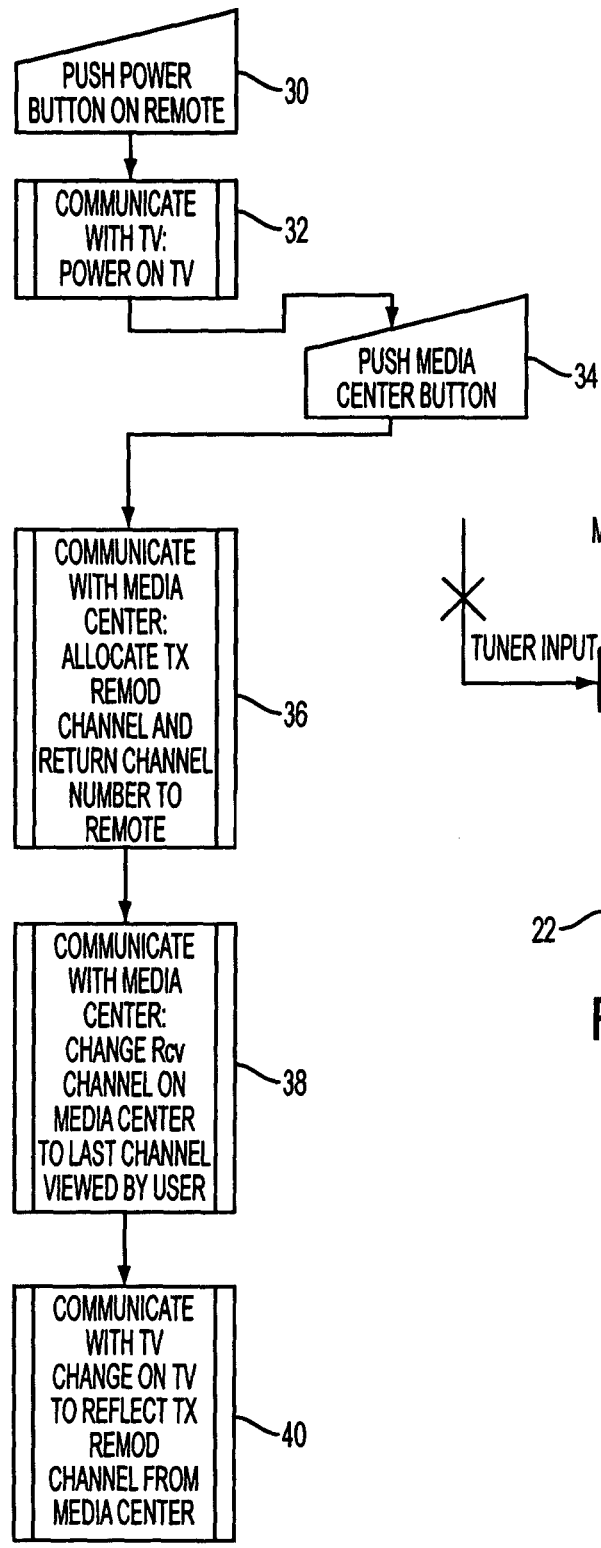
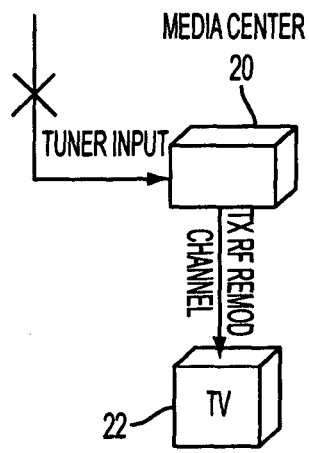
FIG. 2
FIG. 3

SYNCHRONIZING A MEDIA CENTER ON A CORRECT CHANNEL

BACKGROUND OF THE INVENTION

In a home environment, a media center may be set up to interface with multiple audio visual (AV) units (e.g., television(s) (TV(s)), videocassette recorder(s) (VCR(s)), digital video disk (DVD, also referred to as digital versatile disk) recorder/playback devices, and/or other AV units) using RF-remodulation (radio frequency modulation). In order for known arrangements to function properly, the TV or other AV unit should be tuned to a pre-determined channel and the media center should be pre-programmed to remodulate on the pre-determined channel. That is, the media center, as well as the TV or other AV unit, should be coordinated to the proper channel. For example, if the media center is RF-remodulating on channel 3, then the TV or other AV unit should be tuned to channel 3.

The determination of which channel the TV is tuned to and which channel the media center-re-modulates on may be done when the media system is set up. If a TV of a plurality of AV units and the media center share the cable with standard TV broadcasting, the TV may be tuned off-frequency from the media center so that the TV may use the current TV's tuner rather than that of the media center. This may be the case when there are more TV's in the media center of the house than tuners in the media center. Another situation may be that one would like to use the VCR tuner. For example, the TV would first be turned ON and then a user would press the TV/VCR button so that the remote communicates with the TV and the user can change the TV channel to 3. This may be followed by pressing the TV/VCR button again to utilize the VCR tuner.

BRIEF DESCRIPTION OF THE DRAWINGS

The invention may be understood by referring to the following description and accompanying drawings that are used to illustrate embodiments of the invention. In the drawings:

FIG. 2 is a schematic diagram showing the signal flow according to an embodiment of the present invention; and FIG. 3 is a flow diagram according to an embodiment of the present invention.

DETAILED DESCRIPTION OF EMBODIMENTS THE INVENTION

Figure 1:
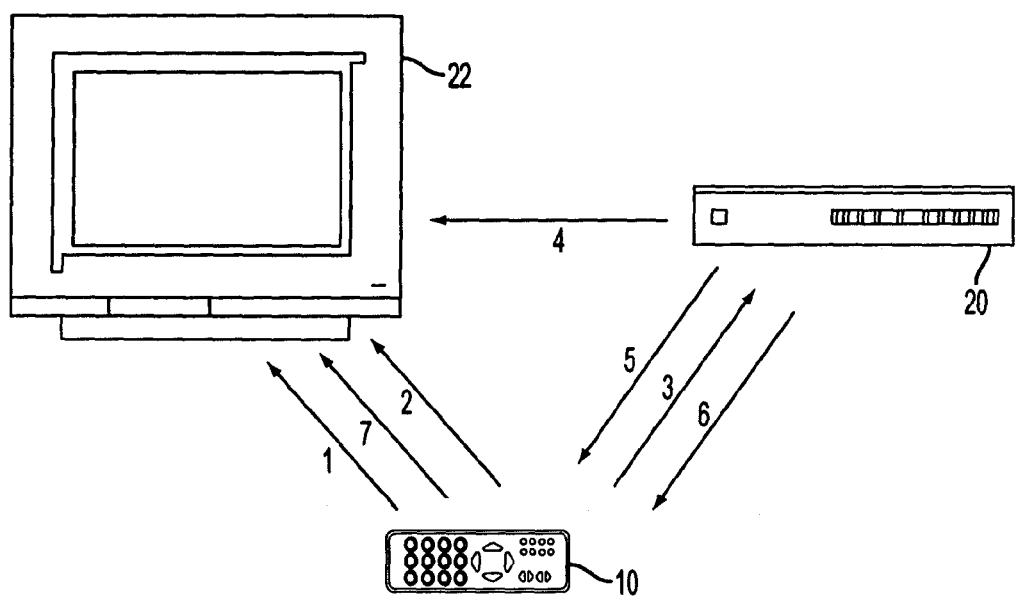
FIG. 1 is a pictorial diagram of an embodiment of the present invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "exemplary embodiment", "various embodiments", etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

In the instant description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

In various embodiments, "RF-remodulation" may refer to taking a National Television Standards Committee (NTSC) signal output from an AV source and transmitting it over a coaxial cable or other RF medium. For example, a VCR utilizing channel 3 or channel 4 may re-modulate a signal of the VCR's tuner. Infrared (IR) signals may be used instead of RF signals. That is, IR and/or RF remodulating may be possible with the present invention, as the intelligent remote control may transmit and receive either infrared signals or radio frequency signals.

In some embodiments, a "media center" may be defined as a center controlling more than one AV unit independently. That is, the media center may control the content on a local TV (in the family room) and an auxiliary TV (in a bedroom). The AV unit, according to various embodiments of the invention, may be, but is not limited to, a stereo (audio), a VCR, a DVD, satellite (radio or television), or local television received via an antenna. That is, the media center may, for example, control a stereo, a VCR, a DVD, satellite TV and/or local television.

According to one embodiment of the invention, a media center may have five (5) different AV units and a single remote control. It is not necessary for a remote control to be pre-programmed for use with one of the five (5) different AV units. That is, a user may be able to move from room to room of a house with a single remote control and seamlessly utilize the single remote control to activate each AV unit of the media center. Alternatively, there may be a remote control for each room; however, each remote control may be used with any of the AV units coupled to the media center.

As shown in FIG. 1, an intelligent remote control 10 may drive the output channel of the media center 20 and the selection of the transmission channel for TV 22 of the media center. The following is an exemplary process of operating the system according to the invention. While the signals of the operation are described in a preferred order below, a different arrangement or order of signals may be possible as one of ordinary skill in the art would understand. First, TV 22 may be turned on with remote control 10, as indicated by arrow 1. A "media center" button on intelligent remote control 10 may then be activated, which may cause the remote control 10 to send a channel change signal to TV 22 to the "last" RF remodulation channel of the media center 20 (arrow 2). The RF remodulation channel indicated by the "media center" button may be the same channel that media center 20 currently is remodulating on. However, the RF remodulation channel may not be the "last" remodulation channel used by media center 20, and the "media center" button may ensure that TV 22 or other AV unit is switched to the channel that media center 20 is currently remodulating on. At the same time, the intelligent remote control may notify the media center 20 that a user would like to use TV 22 by leveraging the capabilities of media center 20 (arrow 3). Media center 20 then may start sending data on the RF remodulation channel to TV 22 (arrow 4) and, preferably at the same time, may send a signal to intelligent remote control 10 indicating the RF channel that media center 20 is currently remodulating on (arrow 5). In effect, intelligent remote control 10 may be sent the a signal representing the RF channel that media center 20 is going to use for RF-remodulation so intelligent remote control 10 may change TV 22 or other AV unit to the appropriate channel to receive the signal.

If the channel that media center 20 is currently remodulating on is different from the channel that TV 22 is currently on, intelligent remote control 10 may notify TV 22 to switch to the appropriate channel that media center 20 is currently remodulating on. Arrow 7 represents the last described signal exchange. That is, the intelligent remote control may automatically switch the RF remodulation channel of the AV unit, without an action by the user. This system may allow the RF remodulation channel to be very dynamic in nature and change depending on which resources (AV units) are in use by media center 20. In addition to dynamic synchronization between the media center and one of the AV units attached to the media center, it may no longer be necessary to pre-configure the media center and for a user to remember to which channel an AV unit needs to be tuned in order to receive a signal from the media center.

As described above, either an IR or a RF signal from an intelligent remote control 10 may be sent to media center 20. FIG. 2 shows a signal being input to the tuner of the media center and the result being that the media center may determine the transmission RF remodulation channel for the selected TV or AV unit. The signal from the remote control may be input to media center 20 to thereby activate the media center and identify the AV unit that is to be controlled by media center 20. As the intelligent remote control 10 may receive data concerning the transmission remodulating channel of media center 20 and TV 22, the intelligent remote control 10 may compare the remodulating channels of the media center and the TV. If the remodulating channels of the media center and the TV are different, intelligent remote control 10 may send a signal to switch to the remodulating channel of media center 20. That is, intelligent remote control 10 may independently cause the AV unit to switch to the transmission channel of the media center.

This system may be further described in the flow diagram of FIG. 3. Initially, a user may push the power button on an intelligent remote control to turn on the power of the TV attached to the media center (boxes 30, 32). Then, as schematically shown in box 34, the "media center" button on the intelligent remote control may be pushed. The "media center" button may cause the intelligent remote control to communicate with the media center, which may allocate the transmission remodulation channel for any AV unit and then may return the transmission remodulation channel number to the intelligent remote control (box 36).

The intelligent remote control then may communicate with the media center to change the received channel (e.g., ABC, CBS, MSNBC, etc.) of TV 22 to the last channel viewed by the user (person) determined by media center 20 (box 38 of FIG. 3 and arrow 6 of FIG. 1). Basically, the intelligent remote control 10 may drive the channel selection so that the AV unit and media center 20 may be tuned to the channel that media center 20 is RF remodulating on and the received channel of TV 22 may be switched to the last channel the person was viewing. This may be achieved by intelligent remote control 10 coordinating with media center 20 to determine what channel media center 20 is remodulating on, and then media center 20 telling (sending a signal to) intelligent remote control 10 which channel (e.g., channel 3 or 4) media center 20 is remodulating on. Media center 20 may also send a second signal (arrow 6) indicating the last received channel that the user (person) was viewing. Thus, intelligent remote control 10 may personalize the received channel of TV 22 to the last received channel viewed by a user of intelligent remote control 10.

For example, media center 20 may have two tuners so that it may recognize which intelligent remote control 10 associated with a specific person is communicating with it. This may allow the specific person to travel from room to room, and by using an intelligent remote control 10, for example, the TV that is leveraged may automatically switch to the television (cable or satellite) channel that the specific person was watching. Thus, media center 20 may cause intelligent remote control 10 to switch an AV unit to the channel on which media center 20 is RF remodulating on. And, if a TV or other AV unit that is tuned to a received channel is to be controlled, media center 20 may send a signal to intelligent remote control 10 to change the TV or other AV unit to the last received channel viewed by that person. Thus, a person may travel with intelligent remote control 10 from room to room and activate different TVs, and all of them may automatically switch to the last channel the viewer was watching assuming, for example, that another person did not activate media center 20 to watch another channel in the interim.

The intelligent remote control may then change the channel on an AV unit to reflect the transmission remodulation channel from the media center (box 40). As a result, the intelligent remote control may identify the AV unit to be used and may inform the media center that the selected AV unit would like to leverage the media center's capabilities. The media center 20 may then send data to the selected AV unit (e.g., stereo, TV, VCR, DVD, etc.).

According to another embodiment of the invention, the remote control may include a personalization device that may remotely hook up an AV unit to the media center with no manual intervention. The remote control may be considered personalized in that it may not be pre-programmed to work with a specific AV unit and may activate any AV unit coupled to a media center and switch to the last received channel viewed by a user of the remote control.

The foregoing description is intended to be illustrative and not limiting. Variations will occur to those of skill in the art. Those variations are intended to be included in the various embodiments of the invention, which are limited only by the spirit and scope of the appended claims.

We claim:

1. A system comprising:
a media center with first and second television tuners, said media center to control first and second audio visual units; and
first and second remote control units to activate said media center, said remote control units to receive a signal from said media center that indicates a transmission channel used by said media center and said remote control units to automatically send a control signal to an audio visual unit to cause the audio visual unit to switch to the indicated transmission channel, each remote control unit to record the last channel selected by the remote control unit for the first audio visual unit, and to automatically tune the second audio visual unit to the last channel selected by said remote control unit when said remote control unit communicates with said second audio visual unit.

2. The system according to claim 1, wherein the indicated transmission channel comprises one of the group consisting of a transmission remodulation channel and a received channel of a particular audio visual program.

3. The system according to claim 1, wherein said remote control units comprise a central control unit of said system.

4. A method comprising:
using a media center with first and second television tuners, said media center to control first and second audio visual units;
enabling at least two different remote controls to register with said media center, said remote controls to communicate with said media center and said audio visual units;
recording the last channel selected by each of said controls; and
automatically tuning a second audio visual unit to the last channel selected by one of said remote controls on said second audio visual unit when said remote control communicates with said second audio visual unit.

5. The method according to claim 4, including pressing a button on a remote control, wherein the remote control sends the signal to an audio visual unit, and wherein the signal represents the prior remodulation channel of the media center.

6. The method according to claim 4, further comprising:
sending data from the media center to an audio visual unit.

7. The method according to claim 6, wherein said sending data occurs simultaneously with receiving a signal that indicates a current remodulation channel of the media center.

* * * * *

UNITED STATES PATENT AND TRADEMARK OFFICE
CERTIFICATE OF CORRECTION

PATENT NO. : 8,079,056 B2  
APPLICATION NO. : 10/928318  
DATED : December 13, 2011  
INVENTOR(S) : Curtis Jutzi and David W. Shinsel Page 1 of 1

It is certified that error appears in the above-identified patent and that said Letters Patent is hereby corrected as shown below:

IN THE CLAIMS:
In Col. 4, line 63, claim 2: "transmission channel" should be --television channel--

In Col. 5, line 4, claim 4: "units;" should be --units, said tuners to receive television programs, said media center to remodulate and transmit said programs to said first and second audio visual units over a selected remodulation channel;--

In Col. 5, claim 4: DELETE lines 9 through 10

In Col. 5, line 12, claim 4: "channel" should be --television channel--

In Col. 6, line 1, claim 4: second audio visual unit when said remote control com-" should be --first audio visual unit and the remodulation channel when said remote control com- --

Signed and Sealed this
Twenty-first Day of February, 2012

David J. Kappos
*Director of the United States Patent and Trademark Office*